(12) United States Patent
Hu et al.

(10) Patent No.: US 10,532,319 B2
(45) Date of Patent: Jan. 14, 2020

(54) DRAW SOLUTE FOR FORWARD OSMOSIS

(71) Applicant: NANYANG TECHNOLOGICAL UNIVERSITY, Singapore (SG)

(72) Inventors: Xiao Hu, Singapore (SG); Yufeng Cai, Singapore (SG); Rong Wang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 740 days.

(21) Appl. No.: 14/786,896

(22) PCT Filed: Apr. 28, 2014

(86) PCT No.: PCT/SG2014/000185
§ 371 (c)(1),
(2) Date: Oct. 23, 2015

(87) PCT Pub. No.: WO2014/175833
PCT Pub. Date: Oct. 30, 2014

(65) Prior Publication Data
US 2016/0074810 A1 Mar. 17, 2016

Related U.S. Application Data

(60) Provisional application No. 61/816,425, filed on Apr. 26, 2013.

(51) Int. Cl.
*C02F 1/44* (2006.01)
*B01D 61/00* (2006.01)
(Continued)

(52) U.S. Cl.
CPC ............ *B01D 61/005* (2013.01); *C02F 1/445* (2013.01); *C08F 120/34* (2013.01);
(Continued)

(58) Field of Classification Search
CPC .. C02F 1/445; C02F 2209/05; C02F 2103/08; B01D 61/002; B01D 61/005; B01D 2311/06; B01D 2311/2642
See application file for complete search history.

(56) References Cited

U.S. PATENT DOCUMENTS

2009/0308727 A1   12/2009   Kirts
2012/0211423 A1   8/2012   Kim et al.
(Continued)

FOREIGN PATENT DOCUMENTS

WO   WO-2011/097727 A1   8/2011
WO   2012/079175 A1   6/2012

OTHER PUBLICATIONS

Ming Ming Ling, Tai-Shung Chung and Xianmao Lu, Chem. Commun., 2011, 47, 10788-10790. (Year: 2011).*
(Continued)

*Primary Examiner* — Pranav N Patel
(74) *Attorney, Agent, or Firm* — Harness, Dickey & Pierce, P.L.C.

(57) ABSTRACT

The present invention provides a draw solute for forward osmosis comprising a carbon dioxide responsive structural unit and a thermally responsive structural unit, wherein the draw solute is capable of reversibly switching between a protonated state and a deprotonated state. The present invention also provides a forward osmosis method utilising the draw solute.

15 Claims, 7 Drawing Sheets

(51) Int. Cl.
*C08F 120/34* (2006.01)
*C08F 220/54* (2006.01)
*C02F 103/08* (2006.01)

(52) U.S. Cl.
CPC ........ *C08F 220/54* (2013.01); *B01D 2311/06* (2013.01); *B01D 2311/2642* (2013.01); *C02F 2103/08* (2013.01)

(56) References Cited

U.S. PATENT DOCUMENTS

2013/0105377 A1  5/2013  Jessop et al.
2014/0076810 A1  3/2014  Jessop et al.

OTHER PUBLICATIONS

International Search Report and Written Opinion of the International Searching Authority for PCT/SG2014/000185, dated Aug. 4, 2014; ISA/AU.
Supplementary European Search Report and Search Opinion dated Dec. 20, 2016 in corresponding European Patent Application No. 14787762.5.

* cited by examiner

DRAW SOLUTE FOR FORWARD OSMOSIS

CROSS REFERENCE TO RELATED APPLICATIONS

This application is a U.S. National Phase Application under 35 U.S.C. 371 of International Application No. PCT/SG2014/000185 filed on Apr. 28, 2014. This application claims the benefit of priority from U.S. Provisional Application No. 61/816,425, filed on Apr. 26, 2013. The entire disclosures of all of the above applications are incorporated herein by reference.

FIELD OF INVENTION

The present invention relates to a draw solute for forward osmosis, and a forward osmosis method using the draw solute.

BACKGROUND

It is recognised that forward osmosis desalination is a much less energy consuming process compared to reverse osmosis. However, the problem in the state of the art is the lack of a suitable draw solute to be used for forward osmosis. Some draw solutes used are able to generate high osmotic pressure but are unable to be regenerated. Other draw solutes being used may be easily regenerated, but are either unable to produce high osmotic pressure or potentially toxic to human health. A commonly used draw solute is ammonium bicarbonate. However, the drawbacks include high reverse diffusion. Further, while the ammonium bicarbonate can be easily recovered by heating up to 65° C., the draw solute dissociates into carbon dioxide and ammonium, and inevitably some ammonium remains in the water and influences the product water quality.

N,N-dimethylcyclohexylamine has also been studied as a potential draw solute. Although a high osmotic pressure can be generated with this draw solute, the problem of this draw solute is that there is membrane degradation, large reverse diffusion and a relatively tedious regeneration method.

Another example of a draw solute is 2-methylimidazole-based ionic liquid. The dissociation of ionic liquid increases the osmolality, but the small molecular weight and strong interaction with water make it difficult to separate from water. Polyelectrolyte of poly sodium acrylate has also been tested. The polyelectrolyte can also generate high osmotic pressure and its relatively larger molecule size compared with ionic liquid makes it possible to be isolated from water by ultrafiltration. However, high pressure (~10 bar) is used and the membrane clogging is inevitable due to the high concentration (~0.1 g/mL) of polymer solution. Other non-functional draw solutes such as glucose, inorganic or organic salts and polyelectrolytes always encounter the trade-off between high osmotic pressure and easy regeneration.

Therefore, they either are incorporated into the final product, or have to rely on some membrane separation process for their recovery, thereby resulting in membrane clogging and low water recovery.

There is therefore a need for an improved draw solute which is able to generate high osmotic pressure, be easily regenerated and cause minimal membrane degradation for use in forward osmosis.

SUMMARY

The present invention seeks to address at least one of the problems in the prior art, and provides an improved draw solute, particularly for use in forward osmosis method. In particular, the draw solute may be used in forward osmosis desalination.

According to a first aspect, the present invention provides a draw solute for forward osmosis comprising a carbon dioxide responsive structural unit and a thermally responsive structural unit, wherein the draw solute is capable of reversibly switching between a protonated state and a deprotonated state.

In particular, the draw solute may switch to a protonated state upon being purged with carbon dioxide, and may switch to a deprotonated state upon being purged with an inert gas.

The draw solute may be a homopolymer, copolymer or oligomer comprising the carbon dioxide responsive structural unit and the thermally responsive structural unit.

The carbon dioxide responsive structural unit may be any suitable polymer. According to a particular aspect, the carbon dioxide responsive structural unit may be a polymer comprising at least one amino group. In particular, the carbon dioxide responsive structural unit may comprise a polyalkyleneimine.

According to a particular aspect, the thermally responsive structural unit may be a polymer comprising at least one functional group selected from the group consisting of: amide, ether and acrylate. In particular, the thermally responsive structural unit may comprise, but is not limited to: polypropylene oxide, poly(N-isopropylacrylamide), poly(N,N'-diethylacrylamide), poly(N-vinyl isobutylamide), poly(N-vinyllactum), polyvinylmethylether and/or poly(dimethylamino)ethyl methacrylate.

The draw solute may have a suitable molecular weight. For example, the draw solute may have a molecular weight of 1200-20000 Da. The molecular weight of the draw solute may be 1300-18000 Da, 1500-17000 Da, 2000-16500 Da, 2500-16000 Da, 3000-15000 Da, 3200-14500 Da, 3500-14000 Da, 3800-13500 Da, 4000-13000 Da, 4500-12500 Da, 5000-12000 Da, 5500-11500 Da, 6000-11000 Da, 6500-10500 Da, 7000-10000 Da, 7500-9500 Da, 8000-9000 Da, 8500-8700 Da. In particular, the molecular weight of the draw solute may be 4000-13000 Da, even more particular, 4000 Da, 9000 Da or 13000 Da.

According to a particular aspect, the draw solute may be a modified polyalkyleneimine such as hydrophobically modified polyethyleneimine, n-butyrylated polyethyleneimine and the like. According to another particular aspect, the draw solute may be poly[2-(N,N-dimethylamino)ethyl methacrylate] (PDMAEMA), poly[2-(N,N-diethylamino)ethyl acrylate], and the like.

The present invention also provides a forward osmosis method for water treatment, the method comprising:
  contacting a feed solution and a draw solution via a semi-permeable membrane positioned therebetween, such that feed water in the feed solution passes through the semi-permeable membrane by osmotic pressure and moves to the draw solution having a higher osmol concentration than the feed solution, wherein the draw solution comprises the draw solute of any of the preceding claims;
  deprotonating the draw solute comprised in the draw solution including the feed water;
  heating the draw solution including the feed water to reversibly agglomerate the draw solute as a precipitate; and
  separating and recovering the precipitate from the draw solution including the feed water to produce recovered draw solute and treated water.

The deprotonating may comprise purging the draw solution including the feed water with an inert gas, thereby deprotonating the draw solute.

The forward osmosis method may further comprise filtering the treated water to further separate the agglomerated but not precipitated draw solute from the treated water to improve quality of the treated water.

The forward osmosis method may further comprise dissolving the recovered draw solute into the draw solution.

According to a particular aspect, the forward osmosis method may comprise protonating the draw solute prior to the contacting. The protonating may comprise purging the draw solution with carbon dioxide.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION

Figure 1:
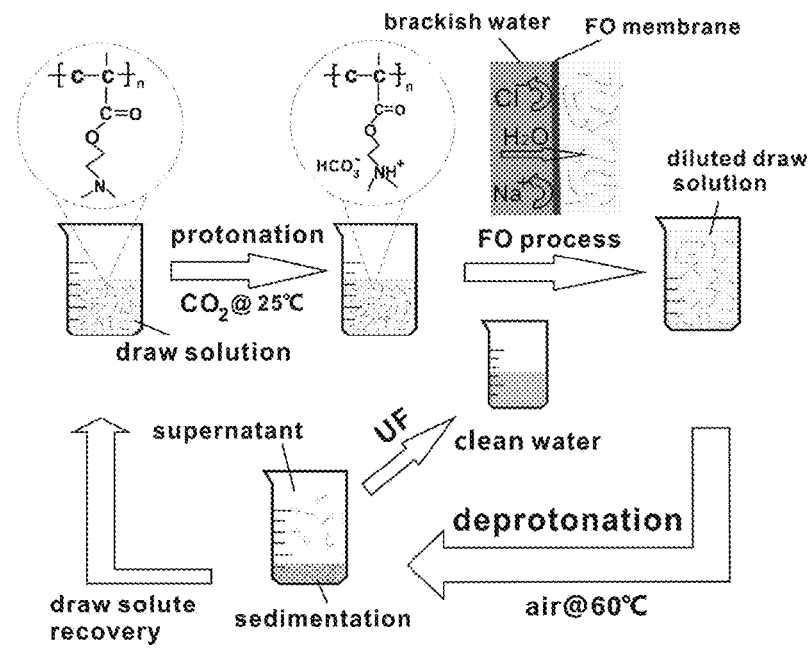
FIG. 1 shows a schematic diagram of a forward osmosis method according to a particular embodiment of the present invention.

Forward osmosis desalination consumes less energy and has less membrane fouling problems compared to the widely used reverse osmosis technique to treat water.

The forward osmosis desalination process allows water molecules to move from a feed solution to the draw solution by using a draw solution having a higher concentration than the feed solution, and then separates a draw solute from the draw solution, reuse it, and produce treated water. An important aspect of forward osmosis desalination is the use of an efficient and effective draw solute in the draw solution. In particular, the draw solute should have the following properties: generate high osmotic pressure, be easily regenerated with less energy consumption, less or non-toxic, have less reverse diffusion into the feed solution and cause minimal or negligible membrane degradation.

The draw solute according to the present invention satisfies the above-mentioned requirements. In particular, the draw solute of the present invention lowers energy cost required in the separation and recovery of the draw solution during the forward osmosis process. The draw solute for forward osmosis comprises a carbon dioxide responsive structural unit and a thermally responsive structural unit, which responds to dual stimuli so as to be easily separated and recovered from the draw solution.

According to a first aspect, the present invention provides a draw solute for forward osmosis comprising a carbon dioxide responsive structural unit and a thermally responsive structural unit, wherein the draw solute is capable of reversibly switching between a protonated (ionised) state and a deprotonated (neutral) state.

In particular, the draw solute may reversibly switch between the protonated and deprotonated states by purging with carbon dioxide or an inert gas, respectively. For example, in use, when the draw solute is in a protonated state, the draw solute becomes a polyelectrolyte and is therefore able to generate sufficiently high osmotic pressure to enable effective and efficient forward osmosis. In particular, the draw solute in its protonated state may enable forward osmosis desalination of seawater to obtain treated water. On the other hand, the deprotonated draw solute is thermally responsive and may precipitate at temperatures above its lower critical solution temperature (LCST), thereby enabling the ease of draw solute recovery by separating out as an agglomerate. Such reversible switching between an ionized state of the draw solute is advantageous for forward osmosis process and solid precipitation under dual stimuli due to the dual responsive draw solute.

The term "lower critical solution temperature (LCST)" refers to the lowest temperature at which the draw solute may be separated from the draw solution. The LCST is dependent on the draw solute, particularly the structure and composition of the draw solute. For example, the LCST may range from 10-60° C. In particular, the LCST of the draw solute may be 12-58° C., 15-55° C., 20-50° C., 25-45° C., 30-40° C., 32-37° C., 33-35° C. Even more in particular, the LCST is about 40° C. It would be clear to a person skilled in the art that the LCST may vary depending on the draw solute.

The draw solute may be a homopolymer, copolymer or oligomer comprising the carbon dioxide responsive structural unit and the thermally responsive structural unit. The draw solute may be in linear form or with other molecular architectures including branched or branches in the shape of a star.

The term "carbon dioxide responsive" refers to a characteristic of being reversibly protonated as the draw solute is purged with carbon dioxide to provide a high osmotic pressure. The carbon dioxide responsive structural unit may be any suitable polymer. For the purposes of the present invention, a polymer may also include an oligomer, homopolymer, copolymer and the like. According to a particular aspect, the carbon dioxide responsive structural unit may be a polymer comprising at least one amino group. In particular, the carbon dioxide responsive structural unit may comprise a polyalkyleneimine. The amino group may be on the backbone of the polymer as in the case of polyalkyleneimine or as a side group as in the case of poly[2-(N,N-dimethylamino)ethyl methacrylate] (PDMAEMA).

The term "thermally responsive" refers to a characteristic of being reversibly self-agglomerated as the temperature increases to achieve separation of the draw solute from the draw solution. According to a particular aspect, the thermally responsive structural unit may be a polymer comprising at least one functional group selected from the group consisting of: amide, ether and acrylate. In particular, the thermally responsive structural unit may comprise, but is not limited to: polypropylene oxide, poly(N-isopropylacrylamide) (PNIPAm), poly(N,N'-diethylacrylamide), poly(N-vinyl isobutylamide), poly(N-vinyllactum), polyvinylmethylether and/or poly(dimethylamino)ethyl methacrylate. The poly(N-vinullactum) may be selected from the following:

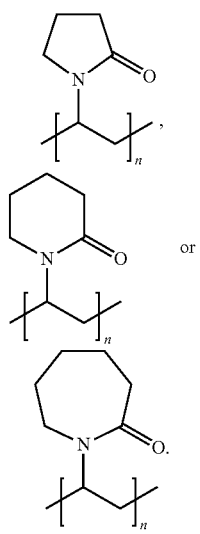

The draw solute may have a suitable molecular weight. Although a draw solute of any molecular weight may be suitable, there is an optimal range. While low molecular weight is suitable for generating a high water flux, it would lead to more reverse diffusion and more difficulties in draw solute regeneration. On the other hand, while high molecular weight has the advantage of easier regeneration and low reverse diffusion, it gives reduced water flux and has high viscosity which is undesirable. The molecular weight is dependent on the draw solute. For example, the draw solute may have a molecular weight of up to 20000 Da. According to a particular aspect, the molecular weight of the draw solute may be 1200-20000 Da. The molecular weight of the draw solute may be 1300-18000 Da, 1500-17000 Da, 2000-16500 Da, 2500-16000 Da, 3000-15000 Da, 3200-14500 Da, 3500-14000 Da, 3800-13500 Da, 4000-13000 Da, 4500-12500 Da, 5000-12000 Da, 5500-11500 Da, 6000-11000 Da, 6500-10500 Da, 7000-10000 Da, 7500-9500 Da, 8000-9000 Da, 8500-8700 Da. In particular, the molecular weight of the draw solute may be 4000-13000 Da, even more particular, 4000 Da, 9000 Da or 13000 Da. It would be clear to a person skilled in the art that the molecular weight may vary depending on the draw solute.

According to a particular aspect, the draw solute may be a modified polyalkyleneimine such as polyethyleneimine, n-butyrylated polyethyleneimine and the like. The modified polyalkyleneimine may be a hydrophobically modified polyethyleneimine. According to another particular aspect, the draw solute may be poly[2-(N,N-dimethylamino)ethyl methacrylate] (PDMAEMA), poly[2-(N,N-diethylamino)ethyl acrylate], and the like. In particular, PDMAEMA has a low LCST of about 40° C. This temperature may be achieved without too much heating thus avoiding the use of big heaters. In particular, since a low LCST is required, the heat may be obtained by using solar heat or industrial waste heat. Accordingly, the recovery of the draw solute may be achieved without consuming too much energy.

According to a particular aspect, the protonated state may have a lower viscosity to reduce concentration polarization. In particular, the draw solute may comprise a branched structure such as a dendrimer polymer or star-shaped polymer.

The present invention also provides a forward osmosis method for water treatment, the method comprising:
  contacting a feed solution and a draw solution via a semi-permeable membrane positioned therebetween, such that feed water in the feed solution passes through the semi-permeable membrane by osmotic pressure and moves to the draw solution having a higher osmol concentration than the feed solution, wherein the draw solution comprises the draw solute of any of the preceding claims;
  deprotonating the draw solute comprised in the draw solution including the feed water;
  heating the draw solution including the feed water to reversibly agglomerate the draw solute as a precipitate; and
  separating and recovering the precipitate from the draw solution including the feed water to produce recovered draw solute and treated water.

Any suitable feed solution may be used for the purposes of the method of the present invention. For example, the feed solution may be seawater, brackish water, ground water, wastewater, and the like. In particular, the feed solution may be seawater to be purified with the forward osmosis method to obtain desalinated water.

The semi-permeable membrane may be any suitable membrane for forward osmosis. For example, the semi-permeable membrane may be any membrane compatible with the draw solution. In particular, the semi-permeable membrane may be a semi-permeable separation layer for forward osmosis which is permeable for water and non-permeable for the subject materials to be separated.

According to a particular aspect, the forward osmosis method may comprise protonating the draw solute prior to the contacting. The protonating may comprise purging the draw solution with carbon dioxide. The purging with the carbon dioxide may be carried out under suitable conditions. For example, the purging may be carried out under ambient temperature and pressure. In particular, the purging may be carried out at 25° C. The osmolality of the draw solute may increase after the protonating.

The deprotonating may comprise purging the draw solution including the feed water with an inert gas, thereby deprotonating the draw solute. Any suitable inert gas may be used for the deprotonating. For example, the inert gas may be air, argon or nitrogen. According to a particular aspect, the inert gas is air. The deprotonating may remove the carbon dioxide in the draw solute. In particular, deprotonating the draw solute may enable the draw solute to regain its thermal sensitivity.

The heating may be carried out at any suitable temperature. In particular, the heating may be carried out at a temperature above the LCST of the draw solute. For example, the heating may be carried out at a temperature of 45-90° C. In particular, the heating may be carried out at 48-88° C., 50-85° C., 55-80° C., 60-75° C., 65-70° C. Even more in particular, the heating is carried out at about 60° C. It would be clear to a person skilled in the art that the temperature at which heating is carried out may vary depending on the draw solute used in the method. The heating above the LCST of the draw solute causes the draw solute to become insoluble and thereby precipitate from the draw solution including the desalinated feed water.

According to a particular aspect, the deprotonating and the heating may be carried out simultaneously or sequentially. When heating is carried out simultaneously, faster removal of the carbon dioxide from the draw solute is achieved.

The separating and recovering may comprise filtering the draw solution including the feed water to obtain recovered draw solute as permeate and treated water as the supernatant. The treated water may comprise some draw solute which did not precipitate out.

Accordingly, the forward osmosis method may further comprise filtering the treated water to further separate the agglomerated but not precipitated draw solute from the treated water to improve quality of the treated water. The filtering may comprise ultrafiltration, microfiltration, nanofiltration or low pressure reverse osmosis.

The forward osmosis method may further comprise dissolving the recovered draw solute into the draw solution. In this way, the draw solute may be regenerated and reused in the forward osmosis method, thereby reducing the overall cost of the method.

Figure 15:
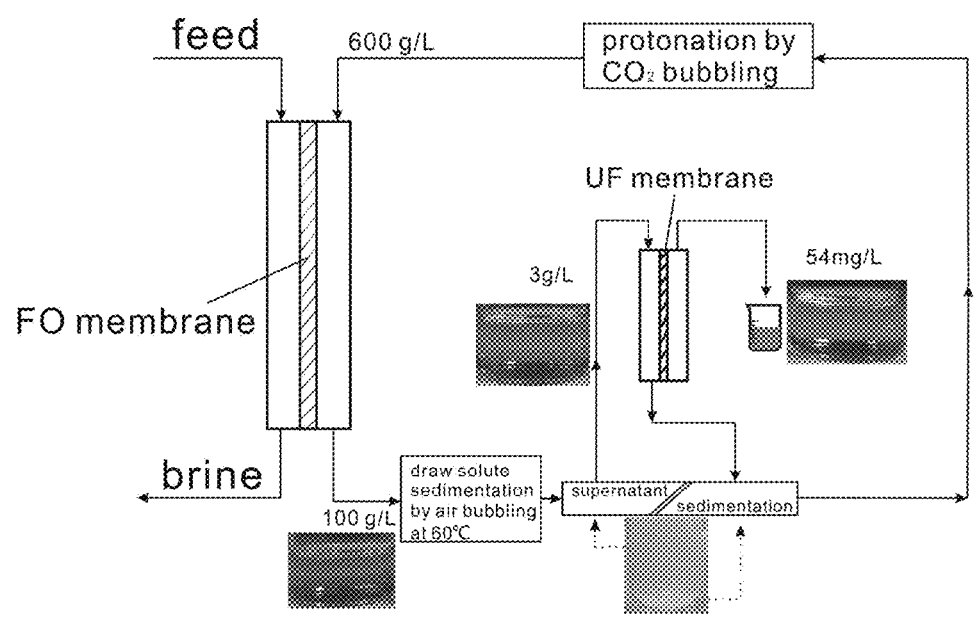
FIG. 15 shows a schematic flow chart showing the integration of the forward osmosis desalination and draw solute regeneration and reuse.

The forward osmosis method of the present invention may be scaled up at an industrial scale and/or as a closed loop system. For example, the process flow as shown in FIG. 15 may be followed. In particular, the main cost which would be incurred in the scaled up process would be from the provision of carbon dioxide, low pressure for the ultrafiltration process and inevitable pumping energy for pumping the draw solution and feed solution flow in pipes.

Having now generally described the invention, the same will be more readily understood through reference to the following examples which are provided by way of illustration, and are not intended to be limiting.

Examples

Preparation of poly[2-(N,N-dimethylamino)ethyl methacrylate] (PDMAEMA) as Draw Solute PDMAEMA samples were synthesised via Atom Transfer Radical Polymerization with number average molecular weights of 4000, 9000 and 13000 Da denoted as P4000, P9000 and P13000, respectively.

All the chemicals were purchased from Aldrich, Singapore. Atom transfer radical polymerization of DMAEMA was carried out in the solvent tetrahydrofuran (THF) using 1,1,4,7,10,10-hexamethyltriethylenetetramine (HMTETA) as the ligand, CuBr as the catalyst and ethyl α-bromoisobutyrate (EBiB) as the initiator. The expected molecular weight was tuned by the molar ratio of monomer to initiator. In a typical synthesis 5 mL THF was purged with pure nitrogen for 15 minutes before 85 mg (0.59 mmol) CuBr, 323 μL (1.18 mmol) HMTETA and 5 mL (29.6 mmol) DMAEMA were charged. 87 μL (0.59 mmol) EBib was injected into the system at 50° C. to initiate the polymerization. The polymerization was terminated by immersing into liquid nitrogen. The ligand-catalyst complex was removed by passing the diluted polymer solution through a neutral aluminium column. The polymer was precipitated in hexane and dried in a vacuum oven at 60° C. after the supernatant was decanted.

The polymers used for the back diffusion measurement, membrane salt rejection and produced water quality analyses were further precipitated once from aqueous solution and then freeze-dried to remove trace amounts of the ligand. The average molecular weight ($M_n$ and $M_w$), and polymer dispersity index (PDI) of the three PDMAEMA polymers synthesized in this study are summarized in Table 1. The molecular weights were determined by size exclusion chromatography (SEC) relative to polystyrene calibration in chloroform with 1% triethylamine at 35° C.

TABLE 1

Summary of number average molecular weight ($M_n$), weight average molecular weight ($M_w$) and polymer dispersity index (PDI) of the three PDMAEMA polymers synthesized.

| Code | $M_n$ (Da) | $M_w$ (Da) | PDI |
|---|---|---|---|
| P4000 | 3921 | 5254 | 1.34 |
| P9000 | 8876 | 11620 | 1.31 |
| P13000 | 12946 | 16426 | 1.27 |

Characteristics of the Prepared Draw Solutes

FIG. 1 represents the mechanism of PDMAEMA used as dual responsive draw solute. The draw solute was protonated to be polyelectrolyte upon reaction with carbon dioxide. The osmotic pressure was high enough to draw fresh water from seawater with acceptable water flux. When the forward osmosis process was finished and the draw solute needed to be separated from the draw solution including the fresh water, inert air as well as moderate heating was used to remove carbon dioxide and convert the draw solute into thermally sensitive deprotonated state. Majority (~90%) of the draw solute polymer precipitated at a temperature of 60° C. for 10 minutes, which may be shortened by isothermal centrifugation. The polymer concentration in the supernatant was further reduced by isothermal filtration through membrane with pore size of 450 nm, since the agglomerated but not precipitated polymer chain clusters had comparable dimension with the visible light wavelength. The final ultrafiltration was used to improve the water quality. Since the draw solute polymer concentration was very low (~3 g/L) before ultrafiltration, the pressure needed in the ultrafiltration process was quiet low (~7 LMH/bar) and water recovery was high (>95%).

Figure 2:
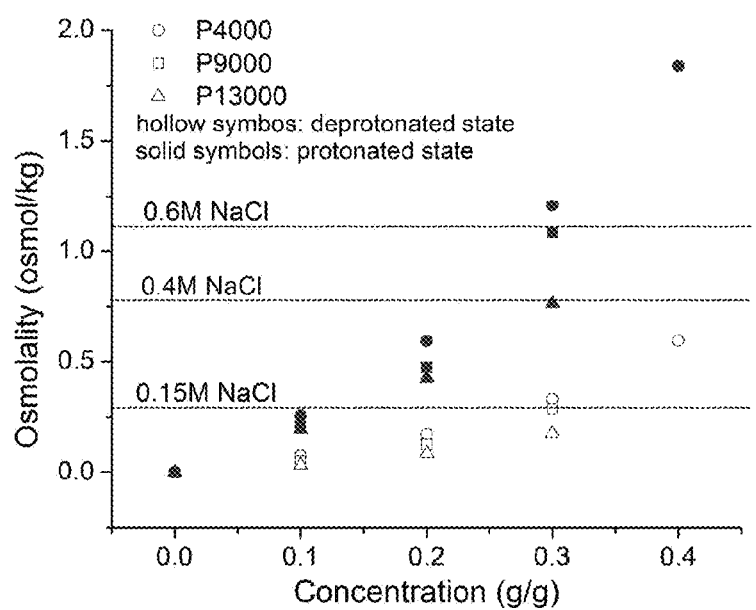
FIG. 2 shows the osmolality of draw solution with different molecular weight and concentration in both protonated state (solid) and deprotonated state (hollow). The three horizontal dotted lines represent the osmolality of 0.15M, 0.4M and 0.6M NaCl solutions.

FIG. 2 shows that osmolality of the polymer draw solutes increases with increasing concentration and with decreasing molecular weight. Also the osmolality increases dramatically when the polymers are switched to the protonated state. For instance, the osmolality of P4000 at a concentration of 0.3 g/g (gram of polymer/gram of water) is 0.331 osmol/kg, which is almost equivalent to that of physiological saline, while after protonation via carbon dioxide purging, its osmolality increases almost by four times to 1.208 osmol/kg, higher than that of seawater. The carbon dioxide induced protonation and ionization are responsible for the large increase in osmolality since the contribution of the dissolved carbon dioxide alone is determined to be only 0.007 osmol/kg, which is negligible. FIG. 2 also shows that for protonated P4000 at 0.4 g/g the osmolality is much higher than that of seawater. In fact, when its concentration is 0.5 g/g or higher, the osmolality values are higher than the detection limit of the osmometer (OSMOMAT 030, Gonotech). Due to differences in solubility, study of P9000 and P13000 is limited to concentrations of 0.3 g/g and below.

Figure 3:
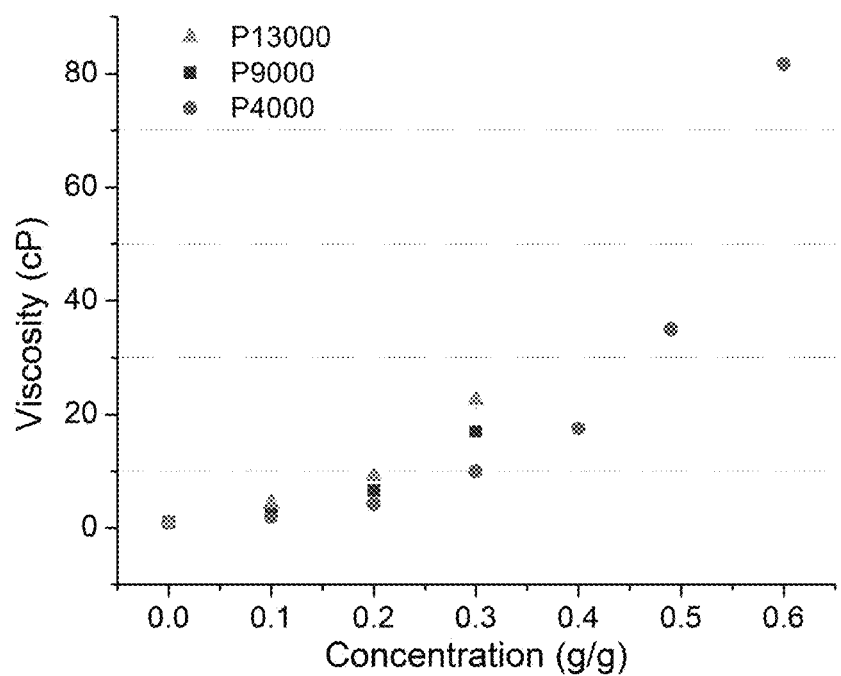
FIG. 3 shows the viscosity of the protonated draw solution with different polymer concentrations.

The viscosity of protonated draw solute as the function of concentration is shown in FIG. 3. The viscosity of 0.6 g/g P4000 draw solute has a moderate viscosity of ~80 cP, which shares similar viscosity with olive oil. Therefore, it would not cause too many difficulties for the draw solution to flow at reasonable speed in a pipe driven by pump.

Based on consideration of solubility, osmolality and solution viscosity, subsequent investigation focuses on P4000 and P9000.

Figure 4:
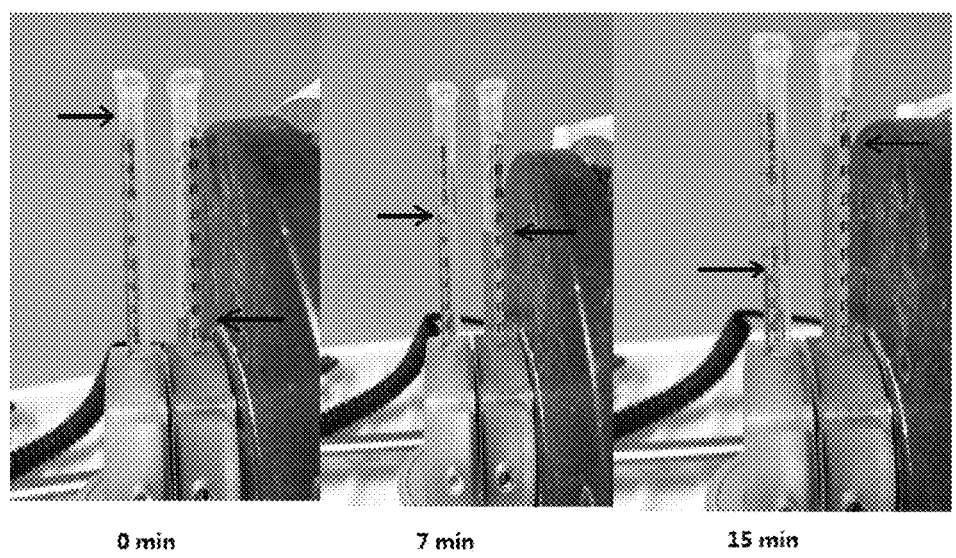
FIG. 4 shows the water flux measurement by a laboratory apparatus. The right chamber contains the P4000 with an initial concentration of 0.4 g/g and the left chamber contains the brackish solution with an initial concentration of 0.15M NaCl. The magnetic stirring rate is 600 rpm.

Water flux measurements were made using the laboratory built apparatus as shown in FIG. 4. Two chambers were separated by the forward osmosis membrane from Hydration Technologies Inc. (HTI) with the orientation of the active layer towards the draw solution (pressure retarded osmosis (PRO) mode). It would be clear to a skilled person that other suitable modes may also be used instead of PRO mode. Magnetic stirring was used to reduce concentration polarization.

The water flux is characterised as litre per square meter per hour (LMH). The water flux was calculated as $\Delta m/(A \cdot t)$, where $\Delta m$ is the weight increase of draw solution (kg), A is the membrane area ($m^2$) and t is the forward osmosis duration (h). The forward osmosis duration was set at 15 minutes. Although a smaller forward osmosis duration time would be better for practical operation, the associated small incremental mass collected during the forward osmosis is problematic to measure accurately. However, an excessively long forward osmosis duration time dilutes the draw solution so that the value would be largely underestimated given that the chamber volume is about 7 ml.

In particular, the draw solution is injected and taken out by a syringe and needle to ensure that no draw solution is lost before and during weight measurement. When the concentration of the P4000 rises over 0.6 g/g, the viscosity is too high for the draw solution to pass through the needle with the pressure that can be applied via the syringe; however, this would not be a problem if a pump were used in a larger scale forward osmosis process.

Figure 5:
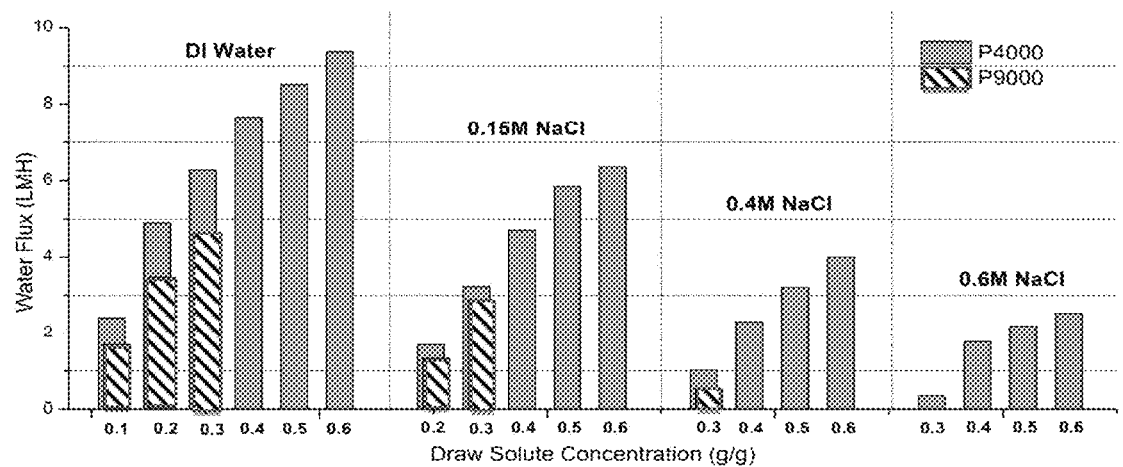
FIG. 5 shows the water flux profile as a function of protonated draw solution concentration and feed solution salinity. The active layer of the forward osmosis membrane was facing the draw solution.

FIG. 5 shows the forward osmosis water flux as a function of draw solution concentration for four feed solutions with different salinity for the P4000 and P9000, respectively. Since the water flux is proportional to the osmotic pressure difference across the membrane, it is understandable that a combination of a concentrated draw solution and a diluted feed solution gives a higher water flux. As expected, the P9000 generates a lower water flux than the P4000 for the same feed solution, which collaborates well with FIG. 2. In particular, the results indicate that the draw solute with smaller molecular weight generates higher water flux, which is consistent with the conclusion that lower molecular weight generates higher osmolality. P4000 can generate sufficient water flux (>2 LMH) against seawater (0.6M NaCl). The premature levelling off of the water flux at higher draw solution concentrations implies that the values would be higher if concentration polarization could be mitigated with more severe agitation, e.g., by using a pump-driven apparatus.

An ideal draw solute should also have low back diffusion to minimize its loss during the forward osmosis process. In particular, protonated P4000 and P9000 aqueous solutions at concentrations of 0.2 g/g and 0.3 g/g, respectively, were used as the draw solution and DI water was used as the feed solution. The amount of draw solute diffusing into the feed solution was determined from the concentration of draw solute in the feed solution and the volume of feed solution after the forward osmosis process. The draw solute concentration was determined from total organic carbon (TOC) measurement. Traditional method of measuring by conductivity is not accurate here, because the contribution of permeated carbon dioxide and draw solute to conductivity is not known.

Figure 6:
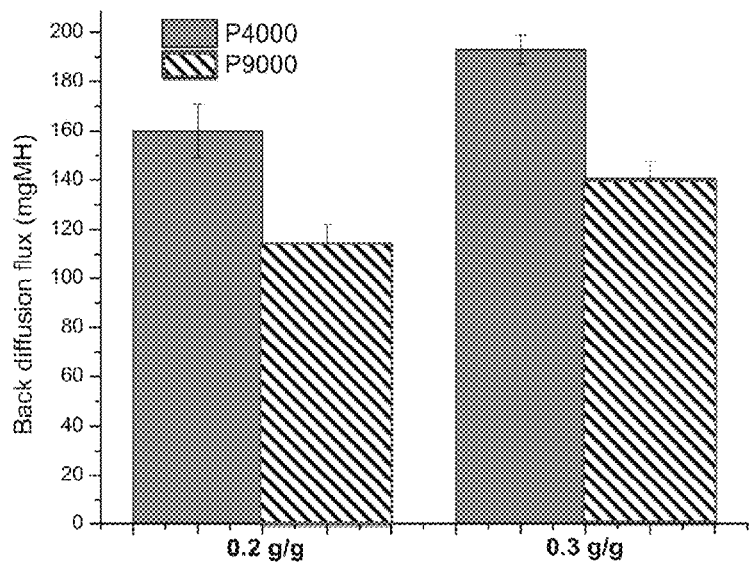
FIG. 6 shows the draw solute back diffusion flux as a function of molecular weight and concentration.
Figure 7:
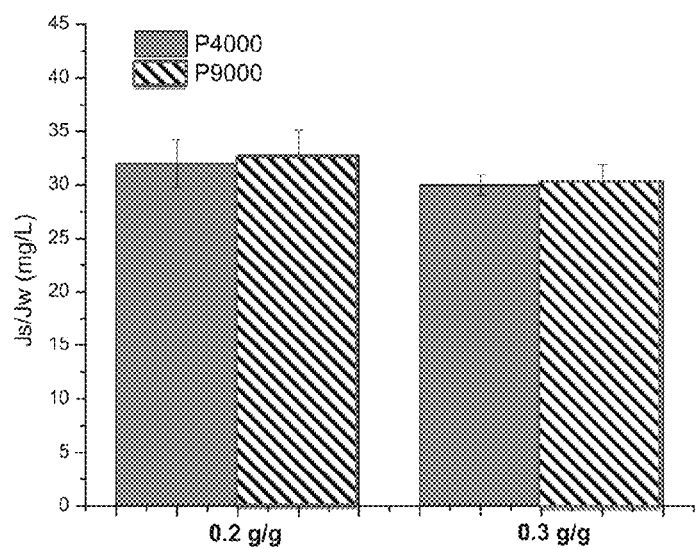
FIG. 7 shows the ratio of draw solute back diffusion flux to the water flux as a function of molecular weight and concentration.

The draw solute leakage was found to increase with the draw solution concentration and decreased molecular weight (see FIG. 6). It is understandable that a higher draw solute concentration increases the chemical potential difference of the draw solute across the membrane and a smaller molecule size causes more leakage. However, the ratio of the draw solute leakage flux to the water flux, $J_s/J_w$, is around 30 mg/L irrespective of the draw solute concentration and molecular weight (see FIG. 7). This means that only 30 mg of draw solute would diffuse into the feed solution for every litre of desalinated water produced. Note that this value is one to two orders-of-magnitude lower than those reported of small molecule draw solutes and also much lower than the 80 mg/l reported for poly(sodium acrylate) when the same type of HTI membrane is used. The relatively large pendent group in PDMAEMA as well as the large size of the bicarbonate anions ($HCO_3^-$) may have contributed to lowering the back diffusion or leakage. The back diffusion may be further reduced by using other membranes such as hollow fibres membranes having higher water-salt selectivity than commercially available membranes.

The stability of the forward osmosis membrane in the draw solutions was assessed by comparing the salt rejection of a new membrane and one after 24 hours immersion in a high concentration (0.6 g/g) of protonated P4000 solution.

In particular, the draw and feed solution concentrations were 0.3 g/g P9000 and 0.1M NaCl, respectively. After the forward osmosis process the draw solution was purged with argon at a temperature of 60° C. to deprotonate and precipitate the draw solute. The supernatant was filtrated isothermally with a syringe filter (450 nm) before passing through an ultrafiltration membrane with a molecular weight cut-off of 3 KDa. Theoretically, all the draw solute should be removed from the draw solution since only NaCl and water can pass through the ultrafiltration membrane (actually conductivity contribution from trace amount of draw solute is negligible). The concentration was determined from its conductivity and the salt rejection was calculated from $R = 1 - (C_d/C_f) \times 100\%$, where $C_d$ is the NaCl concentration in the draw solution, and $C_f$ is the NaCl concentration in the feed solution.

Figure 8:
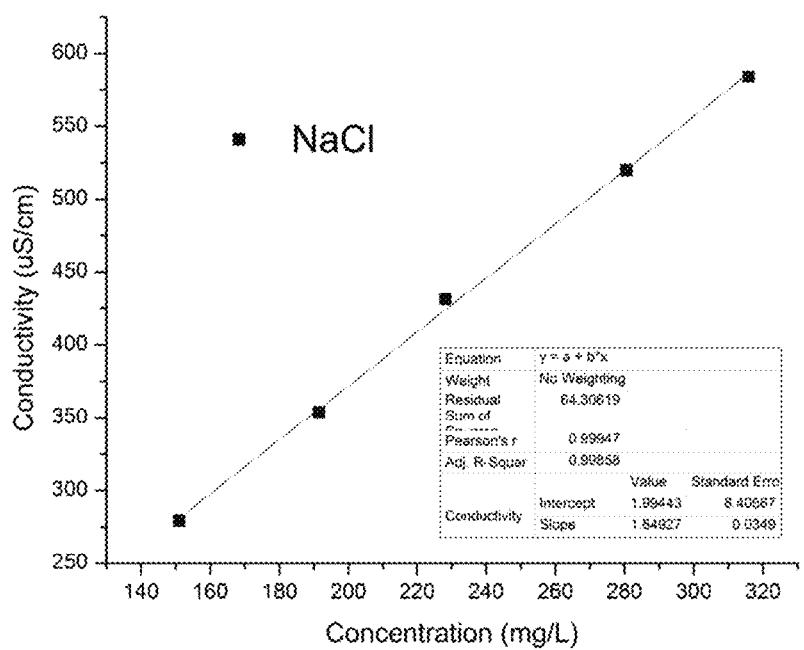
FIG. 8 shows the conductivity-concentration calibration curve for aqueous NaCl solutions.

For the forward osmosis process with the new membrane, the conductivity was 452.9 µS/cm and the NaCl concentration determined from FIG. 8 was 243.8 mg/l. For the membrane after 24 hours of immersion in a concentrated protonated draw solution, the conductivity was 431.1 µS/cm and the NaCl concentration was 232.1 mg/l. The small difference of about 10 mg/L may be attributed as measurement error. The salt rejection for both membranes was R=1−(0.238/5.936)×100%=96%, which is close to the 93%-95% salt rejection provided by the manufacturer of the membrane (HTI).

Although the pH of the deprotonated draw solution was up to 9.4, it reduced to 7.5 at a concentration of 0.6 g/g for protonated P4000. Note that in the method, only the protonated draw solution needs to be in contact with the membrane during the forward osmosis process. This eliminates the possibility of membrane damage by the deprotonated draw solution because the commonly used forward osmosis membranes are known to be stable at a pH between 3 and 8.

The draw solution diluted by the fresh water drawn from the feed solution at the end of the forward osmosis process was purged with inert gas while being heated to above the LCST of the draw solute. The polymer draw solute was then deprotonated by the removal of carbon dioxide, thereby regaining its thermal sensitivity and enabling its regeneration. The carbon dioxide removal was achieved by bubbling argon and simultaneous heating up to 60° C. Simultaneous heating also accelerates the carbon dioxide removal.

Figure 9:
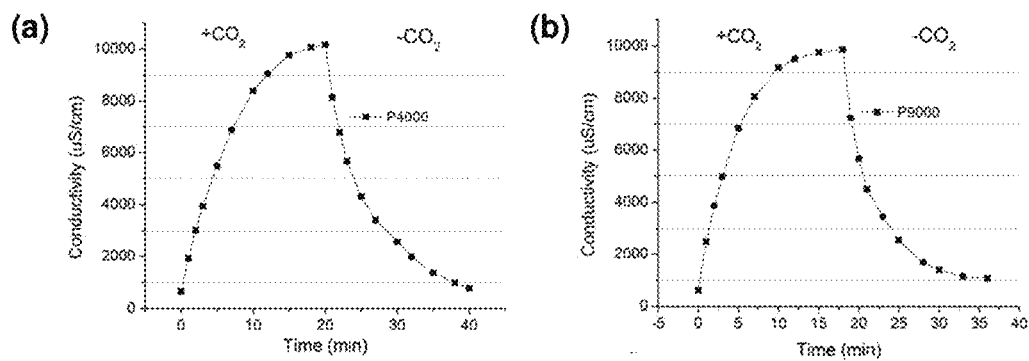
FIG. 9 shows the conductivity as a function of time during the protonation and deprotonation cycle of (a) P4000 and (b) P9000. The carbon dioxide was purged at 25° C. and Ar was purged at 60° C. The gas flow rate was 300 ml/min.
Figure 10:
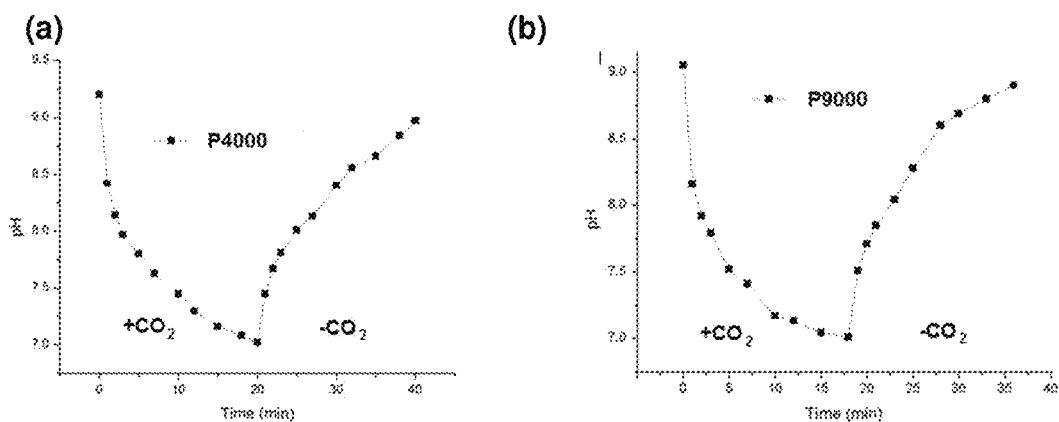
FIG. 10 shows the membrane protonation reversibility of (a) P4000 and (b) P9000 achieved by purging with carbon dioxide at 25° C. and then by Ar at 60° C. shown by pH measurements.
Figure 11:
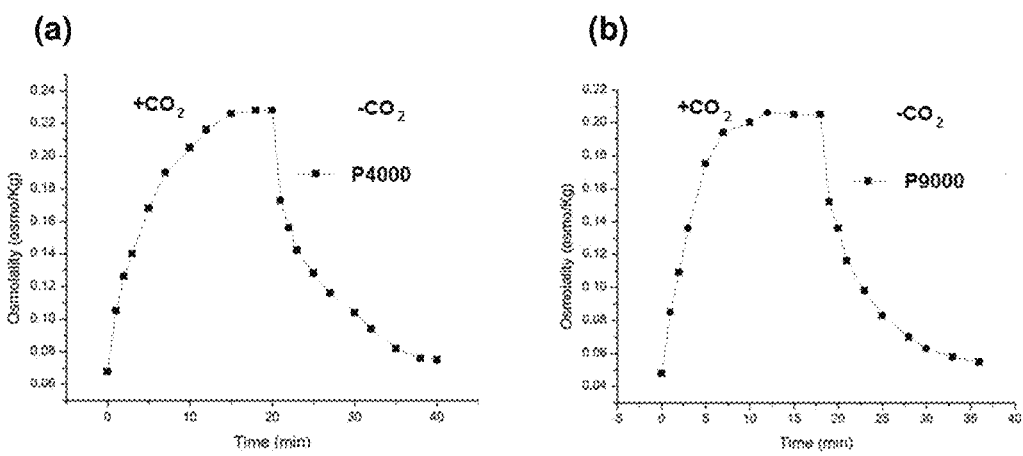
FIG. 11 shows membrane protonation reversibility of (a) P4000 and (b) P9000 achieved by purging with carbon dioxide at 25° C. and then by Ar at 60° C. shown by osmolality measurements.
Figure 12:
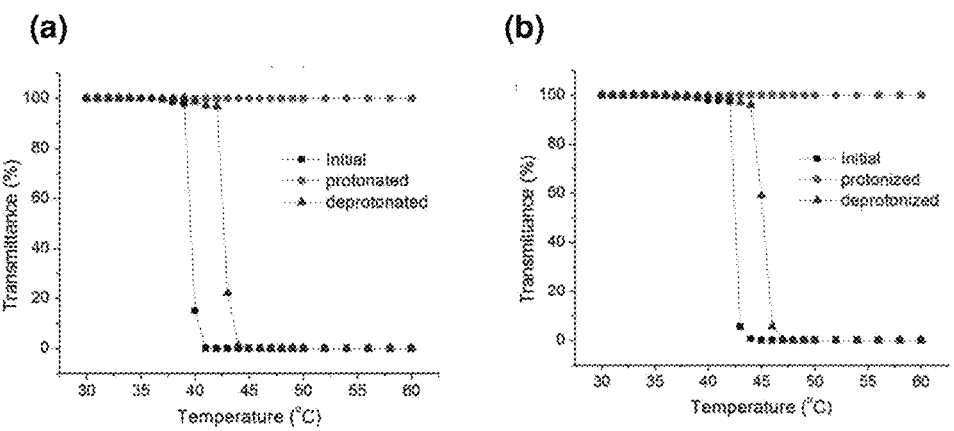
FIG. 12 shows the UV-Vis transmittance (700 nm) measurement for (a) P4000 and (b) P9000 of the as-synthesized, protonated and deprotonated state.
Figure 13:
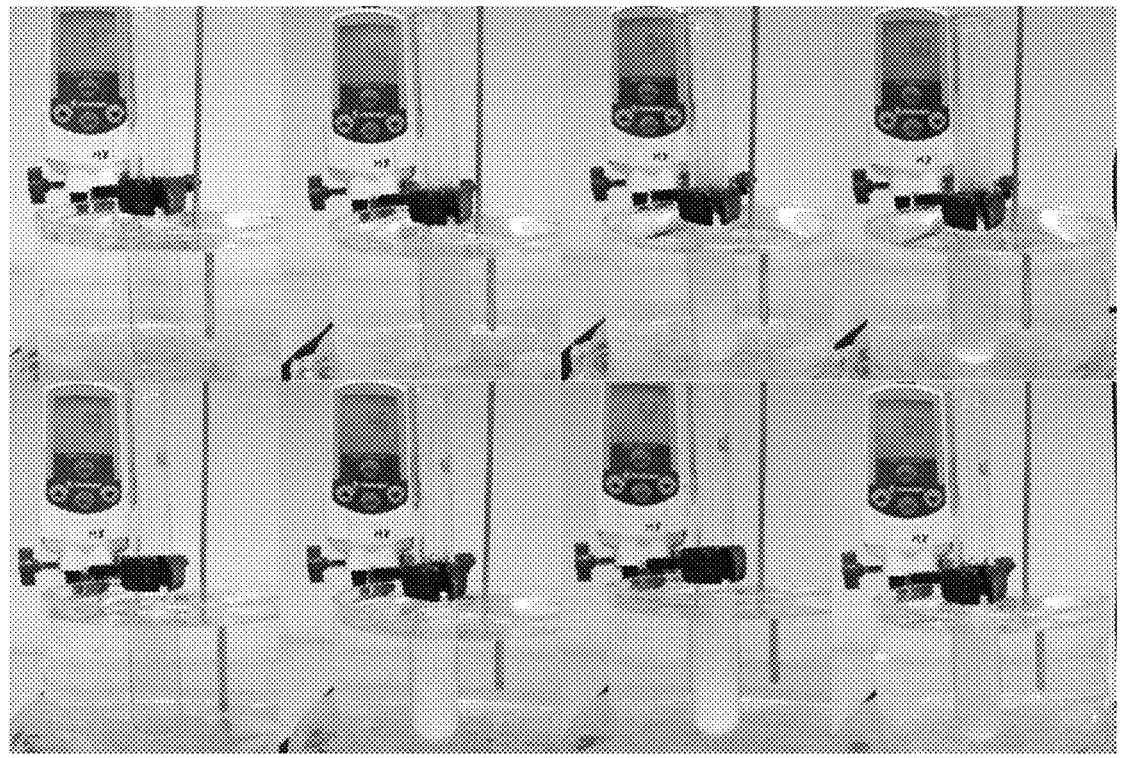
FIG. 13 shows the effect of increasing temperature on the precipitation of the draw solutes. The temperature, as indicated on the screen itself, increases from left to right. The figures in the upper row are from P9000 and those in the bottom row are for P4000.

The protonaton-deprotonation cycle was followed by monitoring the solution conductivity (FIGS. 9a and 9b), pH (FIGS. 10a and 10b) and osmolality (FIGS. 11a and 11b) during the cycling between carbon dioxide purging at 25° C. and argon bubbling at 60° C. The cycle is repeatable and the removal of carbon dioxide and, restoration of the draw solute to its deprotonated thermally responsive state are effective. The light transmittance study (FIGS. 12a and 12b) indicates that the deprotonated draw solute has an LCST of about 43° C. Above the LCST, the draw solute becomes insoluble and precipitates from the diluted draw solution (FIG. 13). The results also confirm that the deprotonation of the draw solute is near completion since there is only about a 3° C. increase in the LCST from the as synthesized form.

Figure 14:
FIG. 14 shows the appearance of draw solution of 0.1 g/g P4000 (left), supernatant after P4000 precipitation (middle) and the final water product (right)

As an example, a deprotonated draw solution at 0.1 g/g was allowed to stabilize at 60° C. for 20 minutes. The draw solute precipitates and the supernatant was then filtered through a 450 nm syringe filter at the same temperature. The draw solute concentration in the permeate was determined by conductivity measurement to be 2.8 and 3.4 g/l for P4000 and P9000, respectively. When the permeate was further polished through an ultrafiltration membrane (PLBC04710, Millipore) with a molecular weight cut-off of 3 kDa, the total organic carbon (TOC) of the final water product was 54.6 ppm and 153.1 ppm for P9000 and P4000, respectively. Due to the low solute concentration, efficient water recovery >95% is achieved at a very low pressure of 1.5 bar in the ultrafiltration, while the water flux of 7 LMH/bar is similar to the permeability of DI water (7.2 LMH/bar). PDMAEMA has a low toxicity (LD50>1.5 g/kg for DMAEMA) and has been extensively studied for drug delivery applications. A visual comparison of the draw solution after forward osmosis, supernatant and ultrafiltered product water is shown in FIG. 14.

Other Methods of Preparing PDMAEMA

Several other methods may be used for preparing the PDMAEMA draw solute as follows:
(i) 2-(Dimethylamino)ethyl methacrylate, N,N,N',N",N"-Pentamethyldiethylenetriamine and CuCl are dissolved in anisole with nitrogen purging. The initiator ethyl 2-bromobutyrate is then injected to initiate the polymerization at 70° C. The synthesized polymer is diluted with large amount of anisole and precipitated in hexane after catalysts removal by passing through neutral aluminium oxide column.
(ii) 2-(Dimethylamino)ethyl acrylate, N,N,N',N",N"-Pentamethyldiethylenetriamine and CuCl are mixed without solvent with nitrogen purging. The initiator ethyl 2-bromobutyrate is then injected to initiate the polymerization at 30° C. The synthesized polymer is dissolved in pH=3 HCl solution and then precipitate the polymer by changing the pH to 12 while heating. Polymers are dialyzed against DI water before use.
(iii) N-Isopropylacrylamide and 2-(Dimethylamino)ethyl methacrylate, N,N,N',N",N"-Pentamethyldiethylenetriamine and CuBr are dissolve in THF with nitrogen purging. The initiator α-Bromoisobutyryl bromide is injected to initiate the polymerization at 50° C. The synthesized polymer is diluted with large amount of THF and precipitate in hexane after catalysts removal by passing through neutral aluminium oxide column.

CONCLUSION

In conclusion, the dual responsive draw solute based on low molecular weight PDMAEMA responds to both carbon dioxide and heat for forward osmosis desalination. When protonated via purging with carbon dioxide, the draw solute possesses sufficiently high osmolality and generates a high water flux in the forward osmosis process. This draw solute can be readily regenerated for reuse after precipitation from the desalinated water under moderate heat and gas purging. The draw solute also has exceptionally low back diffusion. Combined with other merits such as no degradation effects on the forward osmosis membrane and low toxicity, this dual responsive draw solute is an ideal draw solute of forward osmosis desalination.

Whilst the foregoing has described exemplary embodiments, it will be understood by those skilled in the technology concerned that many variations in details of design, construction and/or operation may be made without departing from the present invention.

What is claimed is:

1. A draw solute for forward osmosis comprising a carbon dioxide responsive structural unit and a thermally responsive structural unit, the carbon dioxide responsive structural unit being a polymer comprising at least one amino group and the thermally responsive structural unit being a polymer comprising at least one functional group selected from the group consisting of: amide, ether and acrylate, wherein the draw solute is capable of reversibly switching between a protonated state and a deprotonated state, the draw solute has a molecular weight of 1,200-20,000 Daltons (Da), and the draw solute has a lower critical solution temperature (LCST) of from 10 to 60° C.

2. The draw solute according to claim 1, wherein the draw solute switches to a protonated state upon being purged with carbon dioxide.

3. The draw solute according to claim 1, wherein the draw solute switches to a deprotonated state upon being purged with an inert gas.

4. The draw solute according to claim 1, wherein the carbon dioxide responsive structural unit comprises a polyalkyleneimine.

5. The draw solute according to claim 1, wherein the thermally responsive structural unit comprises: poly(N-isopropylacrylamide), poly(N,N'-diethylacrylamide), poly(N-vinyl isobutylamide), poly(N-vinyllactum), polyvinylmethylether, or poly(dimethylamino)ethyl methacrylate.

6. The draw solute according to claim 1, wherein the draw solute is a homopolymer, copolymer or oligomer comprising the carbon dioxide responsive structural unit and the thermally responsive structural unit.

7. The draw solute according to claim 1, wherein the draw solute is a modified polyalkyleneimine.

8. The draw solute according to claim 7, wherein the draw solute is hydrophobically modified polyethyleneimine, n-butyrylated polyethyleneimine, a copolymer or blend of hydrophobically modified polyethyleneimine and n-butyrylated polyethyleneimine.

9. The draw solute according to claim 1, wherein the draw solute is poly[2-(N,N-dimethylamino)ethyl methacrylate] (PDMAEMA), poly[2-(N,N-diethylamino)ethyl acrylate], or a copolymer or blend of poly[2-(N,N-diethylamino)ethyl methacrylate] (PDMAEMA) and poly[2-(N,N-di ethylamino)ethyl acrylate].

10. A forward osmosis method for water treatment, the method comprising:
contacting a feed solution and a draw solution via a semi-permeable membrane positioned therebetween, such that feed water in the feed solution passes through the semi-permeable membrane by osmotic pressure and moves to the draw solution having a higher osmol concentration than the feed solution, wherein the draw solution comprises the draw solute of claim 1;
deprotonating the draw solute comprised in the draw solution including the feed water;
heating the draw solution including the feed water to a temperature above the LCST of the draw solute to reversibly agglomerate the draw solute as a precipitate; and
separating and recovering the precipitate from the draw solution including the feed water to produce recovered draw solute and treated water.

11. The forward osmosis method according to claim 10, wherein the deprotonating comprises purging the draw solution including the feed water with an inert gas.

12. The forward osmosis method according to claim 10, further comprising filtering the treated water to further separate agglomerated but not precipitated draw solute from the treated water to improve quality of the treated water.

13. The forward osmosis method according to claim 10, further comprising dissolving the recovered draw solute into the draw solution.

14. The forward osmosis method according to claim 10, wherein the method comprises protonating the draw solute prior to the contacting.

15. The forward osmosis method according to claim 14, wherein the protonating comprises purging the draw solution with carbon dioxide.

* * * * *